United States Patent [19]
Chang

[11] Patent Number: 5,321,349
[45] Date of Patent: Jun. 14, 1994

[54] RECHARGEABLE/PORTABLE MULTI-VOLTAGE DC POWER SUPPLY

[75] Inventor: I-Chang Chang, Taipei, Taiwan

[73] Assignee: Iwei Technology Co., Ltd., Taipei, Taiwan

[21] Appl. No.: 988,305

[22] Filed: Dec. 8, 1992

[51] Int. Cl.$^5$ ............................................. G05F 1/63
[52] U.S. Cl. .................................. 323/297; 320/2
[58] Field of Search .............. 323/293, 297, 298, 367, 323/222, 282, 908; 363/56; 320/2, 39, 57

[56] References Cited

U.S. PATENT DOCUMENTS

| | | | |
|---|---|---|---|
| 4,810,948 | 3/1989 | Takuma | 323/297 X |
| 5,084,667 | 1/1992 | Drori et al. | 323/298 |
| 5,146,154 | 9/1992 | Lippmann et al. | 323/367 X |

Primary Examiner—Emanuel T. Voeltz
Attorney, Agent, or Firm—Ross, Howison, Clapp & Korn

[57] ABSTRACT

A rechargeable/portable multi-voltage DC power supply includes an Ni-Cd rechargeable battery set connected to a switching power supply converting circuit, a pulse width modulation circuit, and a filter circuit for providing a regulated output voltage from the filter circuit. A button switch cooperates with a selection circuit and a feedback ratio circuit for selecting a specific output voltage from a plurality of available output voltages. A plurality of light emitting diodes are connected to the selection circuit for indicating the value of the output voltage.

8 Claims, 3 Drawing Sheets

RECHARGEABLE/PORTABLE MULTI-VOLTAGE DC POWER SUPPLY

BACKGROUND OF THE INVENTION

This invention relates to a rechargeable/portable multi-voltage DC power supply, especially to a rechargeable power supply charged by a car.

The rechargeable battery used at the present time is popular because people are traveling over greater distances more often than before. However, if a user brings a plurality of rechargeable batteries to travel, he still has to find at least a legal main source to recharge his batteries. This creates some trouble in finding the electricity main source.

If the user prepares some unchargeable batteries, he will create some garbage from the worn batteries which might even damage the environment. The user might utilize a storage battery to solve the above problems; however, the storage battery as used at the present time merely provides a single output voltage which is not suitable for different utilities, such as television sets, radios, electric pots, and so on.

SUMMARY OF THE INVENTION

A rechargeable/portable multi-voltage DC power supply is provided to mitigate/obviate the above inconvenience of prior storage battery.

It is an object of the present invention to provide a rechargeable/portable multi-voltage DC power supply operable to be recharged by a car and provide several voltage selections for different electrical loads.

It is another object of the present invention to provide a rechargeable/portable multi-voltage DC power supply having a plurality of sockets to be mated with different plugs on different electrical appliances.

It is another object of the present invention to provide a rechargeable/portable multi-voltage DC power supply having a cigarette lighter socket for mating with different electrical appliances suitable to be used on a car cigarette lighter socket.

It is another object of the present invention to provide a rechargeable/portable multi-voltage DC power supply with flashlight which provides protection for shortcircuit or overload by cutting off the power output.

It is another object of the present invention to provide a rechargeable/portable multi-voltage DC power supply having a button switch for continuously changing and selecting output voltage level by each depression.

It is another object of the present invention to provide a rechargeable/portable multi-voltage DC power supply having a plurality of light emitting diodes each of which corresponds to a specific output voltage for showing the present output voltage.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
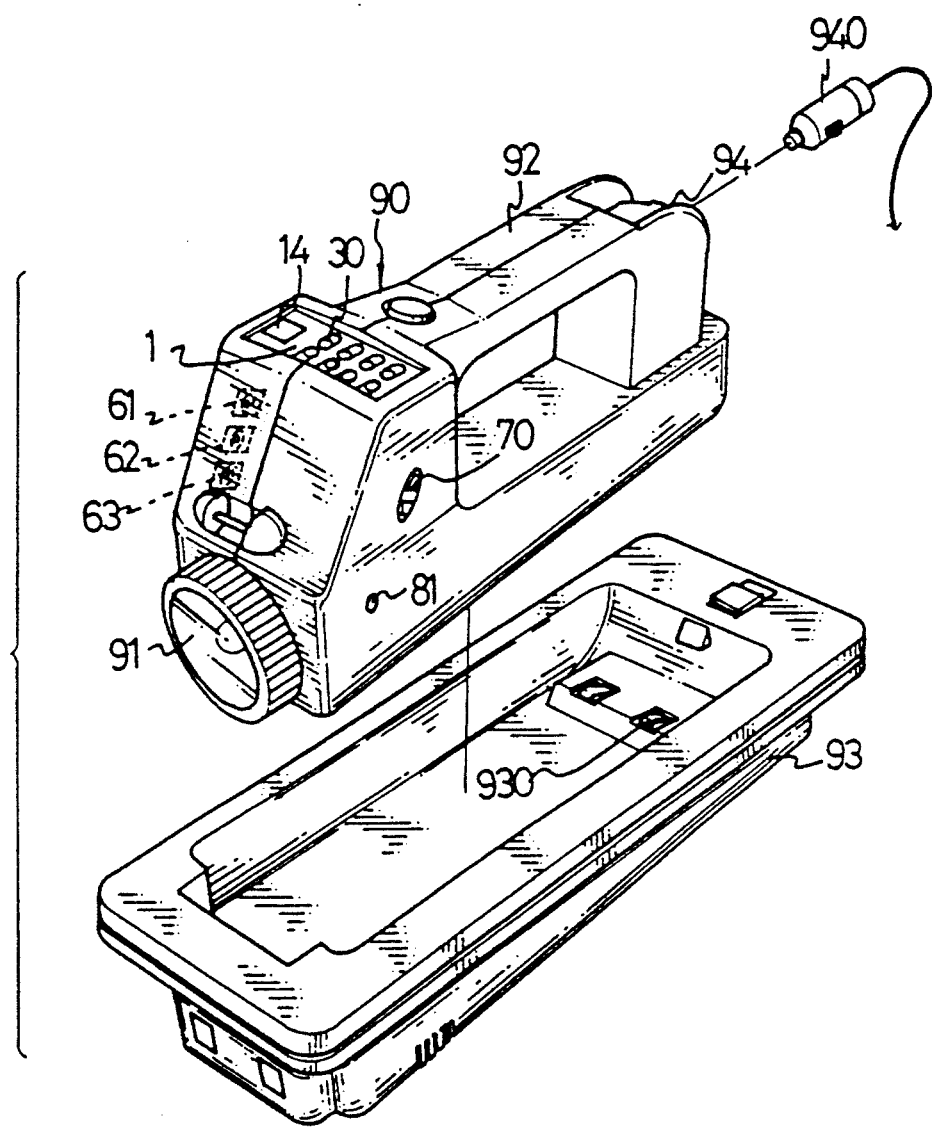
FIG. 1 is a perspective view of a rechargeable/portable multi-voltage DC power supply comprising a power supply body and a recharging socket.

Referring to FIG. 1, a rechargeable/portable multi-voltage DC power supply in accordance with the present invention comprises a power supply body 90 and a recharging socket 93. The power supply body 90 comprises a Ni-Cd rechargeable battery set (see FIG. 2, reference number 80) and a control circuit board (not shown) therein as will be described in more detail. The power supply body 90 has an outlook similar to a high intensity flashlight, having a handle 92 at a top portion thereof, a lamp 91 at a front portion thereof, a power switch 70 at one side near the handle 92 for turning on/off the power supply body 90. An external power input socket 81 is located near the switch 70 allowing an external DC power source (not shown) to provide power when the Ni-Cd rechargeable battery set 80 lacks power for long term use. The power supply body 90 can also be mounted on the recharging socket 93 for recharging on a car. The recharging socket 93 has two charging contacts 930 for recharging the power supply body 90. However, the function of the recharging socket 93 is similar to a charging socket of a wireless telephone set, which is well known and is not described herein. The power supply body 90 can be removed from the recharging socket 93 and used as a multi-voltage DC power supply.

Figure 2:
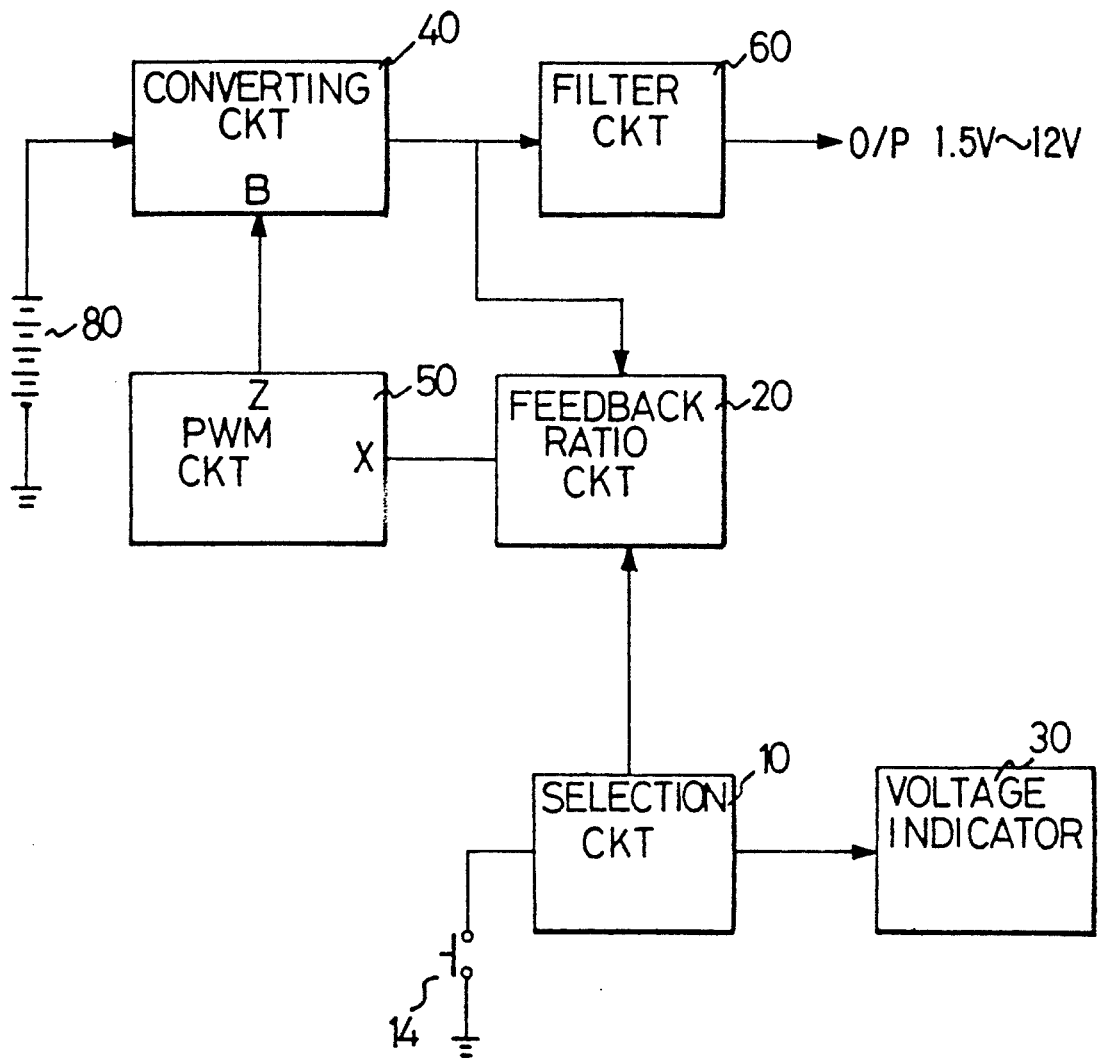
FIG. 2 is a schematic diagram of an electronic circuit in accordance with the present invention.

A plurality of power sockets 61, 62, and 63 are formed at one side opposite to the switch 70 side for mating with different plugs thus enabling the flexibility of the power supply body 90. A cigarette lighter socket 94 is formed at the top rear portion of the handle 92 for mating with the power plug such as the cigarette lighter plug 940. It is well known that some appliances used in car traveling have the same power plugs as cigarette lighter plug 940 for mating with the cigarette lighter socket 94. Therefore, this invention provides different types of power sockets 94, 61, 62, and 63 for mating with different electrical appliances preventing the necessity of connectors. A recess 1 is formed at a top portion of the power supply body 90. A voltage selector 14 is provided in the recess 1 operable to select a specific output voltage from several selections. The voltage selector 14 is a button switch as shown in FIG. 2. A plurality of indicators 30 are located near the voltage selector 14 for indicating the present output voltage. Even at night, the indicators 30 can show the output voltage in a clear manner. When the switch 70 is turned on, one of the indicators representing a lowest output voltage 1.5 volts is on indicating that the present output voltage is 1.5 volts. The output voltage can be adjusted by intermittently depressing the voltage selector 14. The available output voltages at the present invention are 1.2, 1.5, 2, 3, 4.5, 6, 7.5, 9, and 12 volts. Since the switch 70 is initially turned on the output voltage is set at 1.5 volts, if the user depresses the voltage selector 14, the output voltage is changed from 1.5 volts to 1.2 volt. If he keeps depressing the selector 14 several times the output voltage is shifted to 12, 9, 7.5, 6, 4.5, 3, 2, 1.5, 1.2, 12, ,9 . . . etc. and circulating in the mentioned sequence. The changing sequence of the output voltage is from 1.5 volts, through 1.2, 12, 9, 7.5, 6, 4.5, 3, 2, 1.5 volts. For each depressing of on/off, the output voltage is changed to next one. As seen in the above sequence, the output voltage is in a decreasing sequence, except from 1.2 volt to 12 volts. This decreasing sequence can prevent a high voltage from damaging the appliance if the selector switch 14 is mistakenly depressed by a person when the power supply body 90 is providing power to a specific appliance. The only exception is from 1.2-volt to 12-volt. However, this situation will not happen, because when any appliance is in operation, it requires at least some output voltage greater than 1.2 volts.

In addition to the voltage selection function, the present invention also provides other functions such as voltage regulation and overcurrent protection as illustrated in the following and accompanying with FIGS. 2 and 3. Referring to FIG. 2, a recharging battery set 80 provides the electricity power through a switching power converter circuit 40, a pulse width modulation circuit 50, and a filter circuit 60 to further provide regulated output voltage. The recharging battery set 80 together with the switching power converting circuit 40, the pulse width modulation circuit 50, and the filter circuit 60 constitute a so called "switching power supply" to provide the regulated output voltages as mentioned. The pulse width modulation circuit 50 has an output terminal Z coupled to a triggering terminal B of the switching power supply converting circuit 40.

The adjustment of the output voltage is fulfilled by a feedback ratio circuit 20 which is coupled between an output terminal of the switching power supply converting circuit 40 and an input terminal X of the pulse width modulation circuit 50. The feedback ratio circuit 20 is allowed to provide a plurality of resistance values. A selection circuit 10 is coupled to the feedback ratio circuit 20 for determining a specific resistance value of the latter. The ratio circuit 20 obtains a sampling voltage from the output voltage of the switching power converter circuit 40. The ratio circuit 20 responds to the determination of the selection circuit 10, sampling from the output voltage of the switching power supply converting circuit 40, and further generates a feedback voltage to the pulse width modulation circuit 50, which in turn responds to generate a pulse width driving signal to the switching power supply converting circuit 40, thus an output voltage is generated from the output terminal of the switching power supply converting circuit 40 and is further coupled to the filter circuit 60. The pulse width driving signal is a train of pulse whose duty cycle is determined by the feedback voltage from the feedback ratio circuit 20. The greater the duty cycle, the greater the output voltage of the switching power supply converting circuit 40. The filter circuit 60 merely functions as a filter and does not affect the output level of the output voltage. A regulated output voltage is therefore obtained at an output terminal of the filter circuit 60. However, the feedback voltage provided by the feedback ration circuit 20 can be adjusted by changing the effective resistance thereof. The voltage selector 14 as mentioned before is connected to the selection circuit 10. The user can change the feedback voltage of the feedback ratio circuit 20 and further change the output voltage by depressing the voltage selector 14 at least one time. The voltage indicating circuit 30 is coupled to the selection circuit 10 and is driven by the latter for indicating the output voltage.

Figure 3:
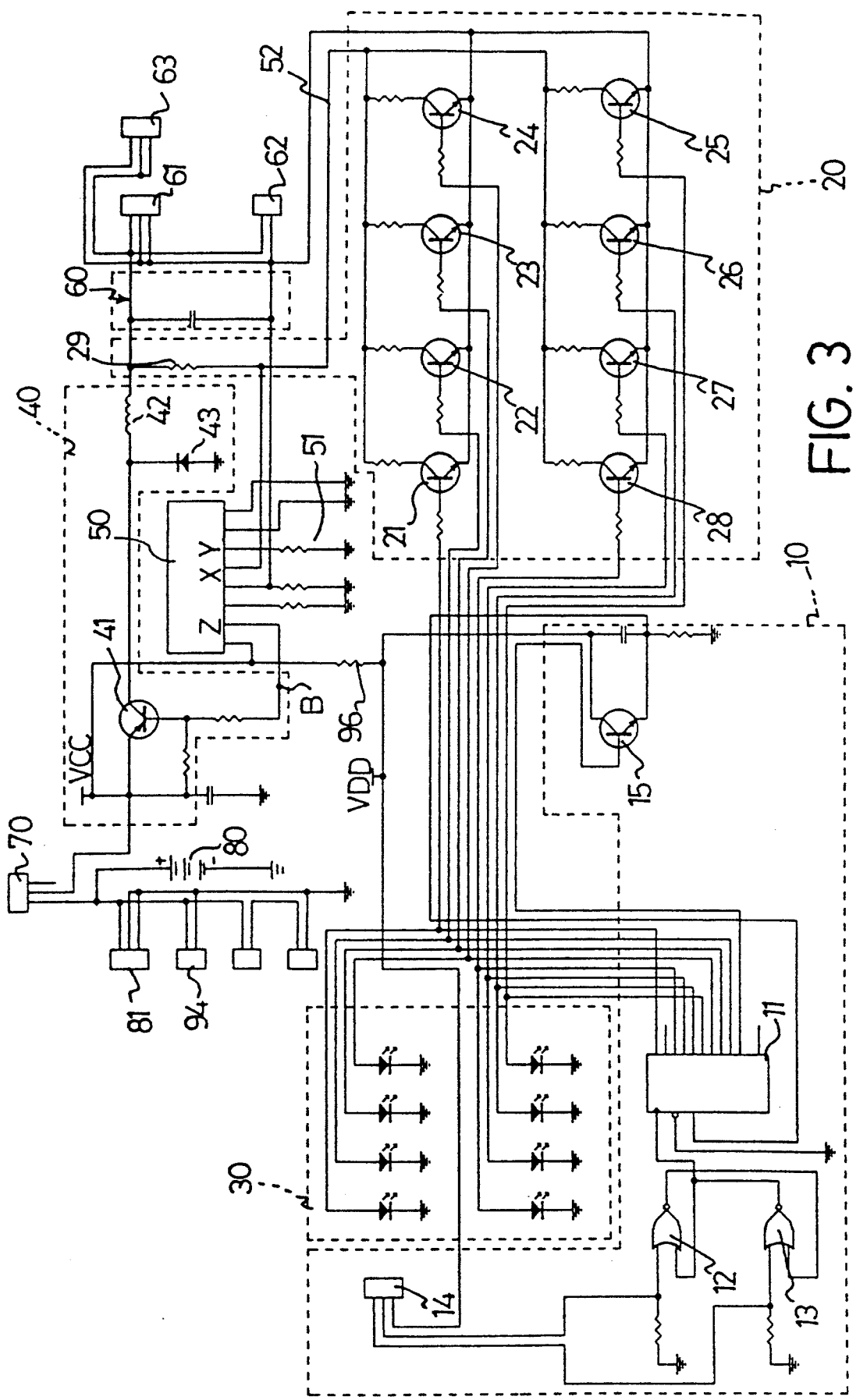
FIG. 3 is a detailed view of FIG. 2.

Referring to FIG. 3, the recharging battery 80 is serially coupled to the power switch 70 which is further coupled to the switching power supply converting circuit 40. The recharging battery 80 can provide a 15 DC volts, which is represented with VCC as the power source. The external power input socket 81 and the cigarette lighter socket 94 as mentioned previously are connected to the recharging battery 80 in parallel. Therefore, the cigarette lighter socket 94 can provide the same voltage of VCC. The power switch 70 turns on, causing the battery 80 to directly couple to the switching power supply converting circuit 40, otherwise decouples the battery 80 from the switching power supply converting circuit 40. The switching power supply converting circuit 40 comprises a transistor 41, a choke coil 42, and a diode 43. An output end of the choke coil 42 is coupled to a plurality of output sockets 61, 62, and 63, via the filter circuit 60. The pulse width modulation circuit 50 has an output terminal Z connected to the base of the transistor 41 providing a pulse signal to continuously switch on/off the transistor 41. The greater the duty cycle of the pulse signal, the greater the output voltage from the power supply converting circuit 40. When any of the output sockets 61, 62, 63 is shortened, the terminal Z outputs a logical high, causing the transistor 41 to be cut off, which in turn causes zero output at the output sockets 61, 62, and 63, thus protecting the whole power supply circuit. However, if the short-circuit situation is removed, the power supply still provides the same output voltage. An overload protection terminal Y of the pulse width modulation circuit 50 is connected to ground via a current limiting resistor 51, such that when overload occurs at the output sockets 61, 62, or 63, the pulse width modulation circuit 50 will limit the output current up to 2.2 amperes, thereby protecting the whole power supply circuit. The pulse width modulation circuit 50 further comprises a feedback input terminal X coupled to the output terminal of the switching power supply converting circuit 40 via a rating resistor 29 and to the feedback ratio circuit 20 via a conductor line 52. The feedback input terminal X receives a feedback voltage from the feedback ratio circuit 20. The feedback ratio circuit 20 has an effective resistance thereof as mentioned previously. The resistance ratio of the rating resistor 29 to the feedback ratio circuit 20 determines the amplitude of the feedback voltage to the pulse width modulation 50. A relatively high resistance ratio indicates a relatively high output voltage, otherwise a relatively low output voltage. The higher the feedback voltage, the lower the output voltage from the switching power supply converting circuit 40.

The selection circuit 10 comprises two NOR gates 12, 13, a decoder 11, a reset transistor 15, and the selector switch 14. The decoder 11 comprises a clock input terminal CLK, ten output terminals Q0 to Q9 and a reset terminal RST. The function of the decoder 11 is well known. The two NOR gates together constitute an RS flip flop as is well known. The selector switch 14 is a button switch, having a normally open contact, a normally closed contact, and a common contact. The common contact is coupled to a logic high VDD. The voltage level of VDD is around 5 volts, which is obtained from the source voltage VCC via a voltage drop by resistor 96. The normally closed contact is coupled to the common contact when the selector switch 14 is not depressed. When the selector switch 14 is depressed, the common contact is switched from the normally close contact to the normally open contact. The normally closed contact and the normally open contact are respectively connected to two input terminals of the RS flip flop 12 and 13. The output terminal of the RS flip flop 12 and 13 is coupled to the clock terminal of the decoder 11. Therefore, when the selector switch 14 is depressed once, a triggering pulse is generated at the output terminal of the RS flip flop to trigger the decoder 11 to shift a logical high from one output pin to next output pin, such as from pin Q1 to pin Q2, or from pin Q7 to pin Q8. Whenever the selector switch 14 is depressed one time, a corresponding pulse is generated at the output terminal of the RS flip flop 12 and 13. The reset transistor 15 has its collector electrode connected to a logic high VDD, the base electrode thereof connected to an output pin Q9 of the decoder 11, the emitter electrode connected to a reset pin RST of the decoder 11. The output pin Q0 of the decoder 11 is in logical high while others are in logical low when the decoder 11 is initially turned on, thus turning on the transistor 21 and further enabling a 1.5-volt output voltage occur at the output sockets 61, 62, 63. The logical high shifts from pin Q0 to pin Q1 when the user keeps depressing the selector switch 14 one time. If the user keeps depressing the selector switch 14 twice then the logical high will shift from pin Q1 to pin Q3, and so on. When the logical high is shifted from pin Q8 to pin Q9, it is coupled to the base electrode of the reset transistor 15 causing the latter to be on, thus further feeding a logical high to the reset pin RST of the decoder 11 and further causing the logical high to shift from pin Q9 to pin Q0.

The ratio circuit 20 comprises eight transistors 21 to 28, each of which is connected with a corresponding resistor having different resistance at the collector electrode thereof. The transistors 21 to 28 have their base electrodes respectively connected to a corresponding output pin of the decoder 11 via a resistor. For example, if pin Q0 of decoder 11 is in logical high, transistor 21 is turned on while others 22 to 28 are all in off status, thus obtaining a specific effective resistance from the ratio circuit 20. If pin Q7 is in logical high, transistor 23 is turned on while others are all in off status, thus obtaining another specific effective resistance from the ratio circuit 20. If pin Q1 is in logical high, none of the transistors 21 to 28 is turned on, thus the ratio circuit 20 is in an open status, having an unlimited resistance. When the ratio circuit 20 is in an open status, the output voltage is totally fed back to the pulse width modulation circuit 50, which in turn causes a reference low voltage 1.2-volt from the feedback terminal Z of the pulse width modulation circuit 50 to the switching power supply converting circuit 40, thus obtaining a 1.2-volt output at the output sockets 61, 62, 63. Therefore, the effective resistance of the ratio circuit 20 is changed by depressing the selector switch 14 one time. In this embodiment, the effective resistance might be selected from eight values. However, the above eight values are changeable by changing the collector resistors as mentioned.

The voltage indicator 30 comprises eight light emitting diodes each of which is connected to a corresponding output pin from pins Q0, Q2, Q3, Q4, Q5, Q6, Q7, Q8, Q9. When an output pin of the decoder 11 is in logical high, a corresponding light emitting diode is on showing the corresponding output voltage. When pin Q1 is in logical high, none of the light emitting diodes is on, thus showing the output voltage is 1.2-volt.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A rechargeable/portable multi-voltage DC power supply comprising:
   a rechargeable batter (80);
   a switching power supply converting circuit (40) coupled to said rechargeable battery (80) for generating an output voltage;
   a filter circuit (60) connected to said switching power supply converting circuit (40) for filtering said output voltage;
   a feedback ratio circuit (20) being connected to said switching power supply converting circuit (40) and comprising a plurality of transistors, each of which is connected with a corresponding resistor having different resistance at the collector electrode thereof, and providing one of a plurality of feedback voltages which are determined by an effective resistance of said feedback ratio circuit (20);
   a pulse width modulation circuit (50) having an input end connected to said feedback ratio circuit (20) for receiving said feedback voltage, and an output end connected to said switching power supply converting circuit (40);
   a selection circuit (10) connected to said feedback ratio circuit (20) operable to determine said resistance of said feedback ratio circuit (20) thus further determining said output voltage; and
   whereby said switching power supply converting circuit (40), said pulse width modulation circuit (50), and said filter circuit (60) constitutes a switching power supply.

2. A rechargeable/portable multi-voltage DC power supply as claimed in claim 1, wherein said switching power supply converting circuit (40) comprises a transistor (41), a choke coil (42), and a diode (43).

3. A rechargeable/portable multi-voltage DC power supply as claimed in claim 1, wherein said filter circuit (60) is a capacitor.

4. A rechargeable/portable multi-voltage DC power supply as claimed in claim 1, wherein said pulse width modulation circuit (50) comprises an output terminal (Z) for providing pulses to continuously switch on/off the switching power supply converting circuit (40), an overload protection terminal (Y) connected to ground via a current limiting resistor (51) for limiting the output current to a predetermined value when overload happens, and a feedback input terminal (X) for receiving the feedback voltage from the feedback ratio circuit (20).

5. A rechargeable/portable multi-voltage DC power supply as claimed in claim 1 further comprises a voltage indicator (30) having a plurality of light emitting diodes connected to said selection circuit (10) for showing the output voltage.

6. A rechargeable/portable multi-voltage DC power supply having a power supply body (90) which has a flashlight at the front end thereof and a rechargeable battery set (81) installed therein, the improvement comprising:
   said power supply body (90) having a displaying plate (1) comprising a plurality of light emitting diodes (30) at the top surface thereof for showing the output voltage and a button switch (14) operable to select a specific output voltage from a plurality of available voltage values, a plurality of output sockets (61, 62, and 63) formed at one side thereof for outputting said specific output voltage, a switching power supply comprising a switching power supply converting circuit (40), a pulse width modulation circuit (50), and a filter circuit (60) for supply the output voltage, a feedback ratio circuit (20) comprising a plurality transistors (21 to 28) and resistors for providing a feedback voltage to said pulse width modulation circuit (50), a selection circuit (10) having a decoder (11) which has a clock input terminal (CLK) for receiving a pulse signal from operation of said button switch (11) and a plurality of output terminals (Q0 to Q9) each of which is connected to a corresponding triggering electrode of said transistor of said feedback ratio circuit (20), such that said decoder (11) is allowed to have a logical high output at one of the output terminals (Q0 to Q9) thereof and further causing a corresponding effective resistance of said feedback ratio circuit (20), thus causing a corresponding output voltage from said filter circuit (60).

7. A rechargeable/portable multi-voltage DC power supply as claimed in claim 6 further comprises a flip flop (12 and 13) connected between said button switch (14) and said decoder (11) for responding to each depression to said button switch (14) and generating a pulse to said decoder 11.

8. A rechargeable/portable multi-voltage DC power supply as claimed in claim 6, wherein said pulse width modulation circuit (50) has an overload terminal (Y) connected to ground via a current-limiting resistor 51 such that when overload occurs, said DC power supply will limit the total output current thereof to a predetermined value.

* * * * *